Oct. 23, 1923. 1,472,012
C. L. A. M. LEBLANC
METHOD OF BALANCING DISTURBING FORCES AND COUPLES WHICH ARE PRODUCED
IN A RECIPROCATING ENGINE
Filed Aug. 3, 1921 2 Sheets-Sheet 2

INVENTOR

Patented Oct. 23, 1923.

1,472,012

UNITED STATES PATENT OFFICE.

CHARLES LÉONARD ARMAND MAURICE LEBLANC, OF PARIS, FRANCE, ASSIGNOR TO SOCIÉTÉ ANONYME POUR L'EXPLOITATION DES PROCÉDÉS MAURICE LEBLANC-VICKERS, OF PARIS, FRANCE.

METHOD OF BALANCING DISTURBING FORCES AND COUPLES WHICH ARE PRODUCED IN A RECIPROCATING ENGINE.

Application filed August 3, 1921. Serial No. 489,600.

*To all whom it may concern:*

Be it known that I, CHARLES LÉONARD ARMAND MAURICE LEBLANC, a citizen of the Republic of France, residing in Paris, France, have invented an Improvement in Methods of Balancing Disturbing Forces and Couples, which are Produced in a Reciprocating Engine, of which the following is a specification.

In engines comprising cylinders in which a piston has a reciprocating motion converted into rotary motion by a connecting rod and crank system, the several moving parts give rise to periodic inertia forces and couples. These forces and couples are the cause of disturbing reactions, which affect the bearings of the engine. In the case of motor cars especially these reactions cause vibrations in the springs and underframe, which it is desirable to reduce to a minimum, and at the same time they impart insupportable rocking, pitching and zigzag movements to the car.

The balancing of the inertia forces and couples is effected in practice in several ways: Suitably calculated balance weights may be arranged on certain of the moving parts; this method gives only very inadequate results. In motor car construction attempts have been made to combine with this method the use of multiple driving cylinders acting on the same driving shaft and suitably arranged with respect to each other.

The present invention has for its object a simple method for balancing in a perfect manner a single cylinder engine and it may be extended to engines with several cylinders.

Figure 1:
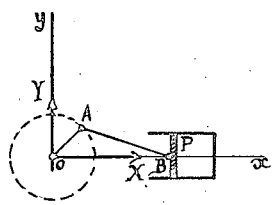

Fig. 1 is a diagrammatic section of an engine of the single cylinder type through a plane containing the axis $Ox$ of the cylinder and at right angles to the axis of rotation, which is indicated at O.

Figure 2:
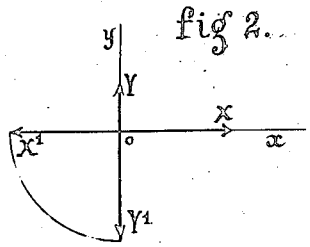
Figure 3:
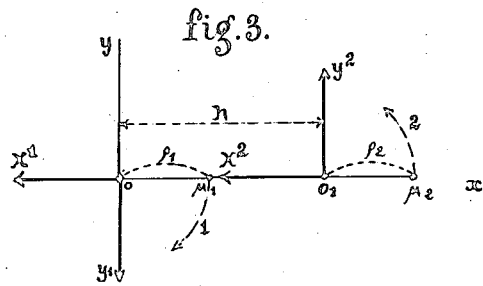
Figure 4:
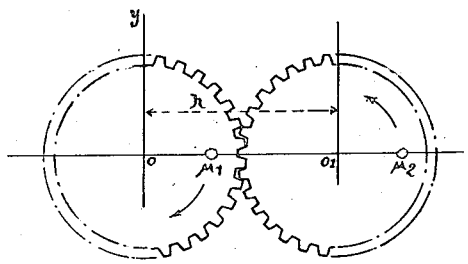
Figure 5:
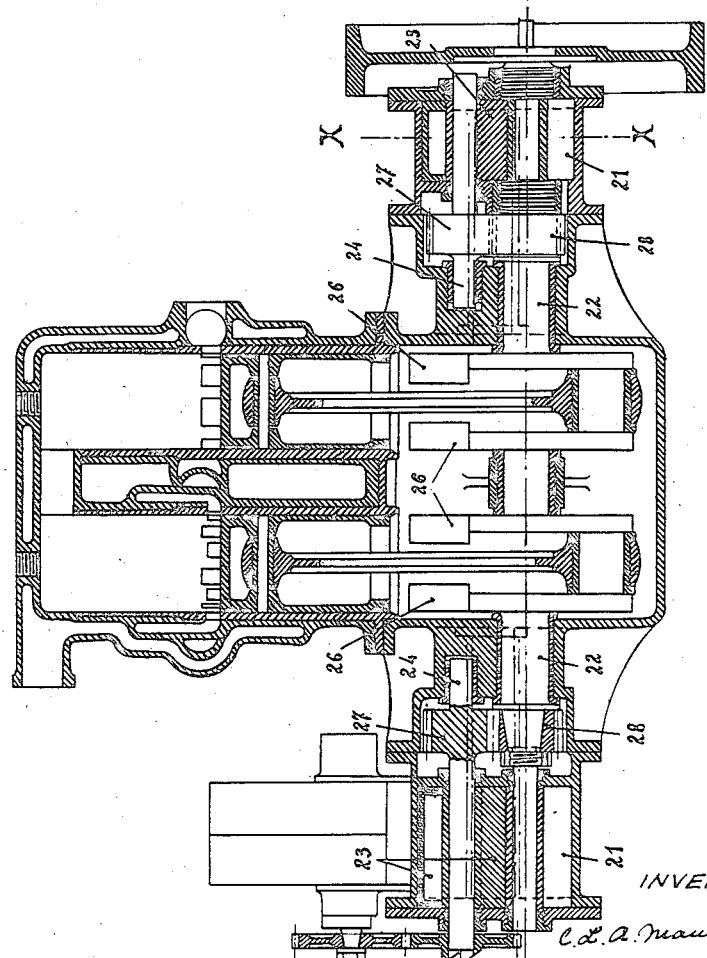

Figs. 2 and 3 are theoretical diagrams. Fig. 4 illustrates one method of carrying out the balancing system; Fig. 5 is a longitudinal section and Fig. 6 a cross section on the line XX of Fig. 5, of a two cycle engine with two cylinders the piston and connecting rods of which are coupled to the same crank shaft, and to which the balancing system of the present invention is applied by making use for this purpose of geared blowers of the Roots type.

Referring to Fig. 1, P is the piston, AB the connecting rod and AO the crank. The reciprocating motions communicated to these moving parts give rise at each instant to inertia forces of which X, Y are the components on the co-ordinate axes $Ox$, $Oy$ of the resultant F of these forces.

On the other hand the oscillatory motion of the connecting rod around its centre of gravity gives rise to an inertia couple G, the axis of which is at right angles to the plane of the figure.

The components X, Y of the force F and the couple G are of necessity periodic time functions, and it is known that such functions may be expressed by the sum of sine functions of increasing frequency of the form:

A $\sin 2\pi \; nt$ + B $\sin 4\pi \; nt$ + C $\sin 6\pi \; nt$ + etc., in which $n$ is the frequency of the engine, that is to say the number of revolutions per second. Theory shows that in the conditions of practice the terms of a frequency higher than that of the engine are generally negligible, and that X, Y, G, may be expressed by equations of the form—

$$X = 4\pi^2 \; n^2 \; A \sin 2\pi \; nt$$
$$Y = 4\pi^2 \; n^2 \; B \sin 2\pi \; nt$$
$$G = 4\pi^2 \; n^2 \; C \sin 2\pi \; nt$$

in which the coefficients A, B, C, depend only on the dimensions, masses and shape of the moving parts.

When an excentric additional mass is keyed on the shaft of the engine, the rotary motion of this mass produces no couple but gives rise to a supplementary force the components $X^1$, $Y^1$, of which along the axes $Ox$, $Oy$ are two sine functions of frequency N and of the same amplitude (Fig. 2). The mass of this counterweight may be chosen and it may be keyed in such manner as to balance continuously the force X produced by the engine along the axis of the cylinder; it is seen however, that the component $Y^1$, which will have been produced simultaneously cannot balance the component Y. With regard to the couple, this will not have been altered. An additional excentric mass does not allow of an adequate balance being attained.

But if around an auxiliary axis O', integral with the fixed parts of the engine, parallel to its axis and situated in the plane of symmetry passing through this axis and that of the cylinder, a second additional mass is arranged, and is caused to rotate at the same speed as the first, but in the reverse direction, the rotary motion of these two masses produces forces and a couple, which, provided they are suitably fixed and dimensioned permits a complete balance of the engine to be attained.

In Fig. 3, let $\mu'$ be the additional mass fixed on the shaft of the engine at a distance $\rho'$ from the axis O; let $\mu^2$ be the second additional mass rotating around the auxiliary axis $O^1$ at a distance $\rho^2$ from this latter. Let $h$ be the distance apart of the two axes O, $O^1$. The mass $\mu'$ rotates in the direction of the arrow 1, the mass $\mu^2$ in the direction of the arrow 2. The first mass produces the forces $X'$ $Y'$ acting at O, the second the forces $X^2$ $Y^2$ acting at O'; by fixing $\mu'$ suitably with respect to $\mu^2$, it may be arranged that $X^2$ is continuously directed in the same direction as $X'$; the component $Y^2$ will then be continuously directed in the reverse direction to $Y'$. It is possible to determine $\mu'$ $\rho'$ and $\mu^2$ $\rho^2$ in such manner that the components $X'+X^2$; $Y'-Y^2$ of the forces due to the additional masses respectively balance at each instant the forces $X$ $Y$ produced by the moving parts of the engine.

On the other hand the rotation of the additional masses gives rise to a couple $h$ $(Y'-Y^2)$; $h$ can be chosen in such manner that this additional couple balances the couple due to the engine.

It is thus clear that by employing this second additional mass it is possible to ensure the complete balance of the engine.

The system of balancing can be obtained practically in the following way:

Two wheels or two trains of gear wheels of the same radius are fixed respectively on the shafts O and O'; the masses $\mu'$ and $\mu^2$ are respectively keyed on each of these wheels, at suitable distances from the axis (Fig. 4).

The desired result can also be obtained by putting one of the wheels out of balance with the other, for example by means of apertures suitably made in one of them.

Figure 6:
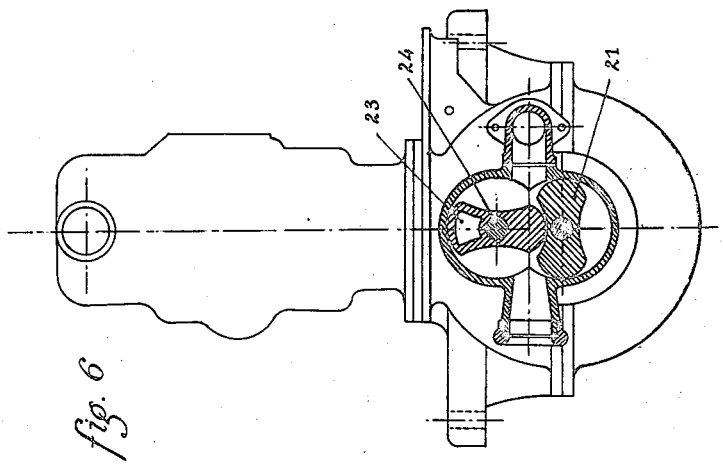

It is this system which is applied in the engine shown by way of example in Figs. 5 and 6.

In this two cycle engine, two blowers of the Root's type, which serve to force air into the cylinders, are located at the two ends of the shaft at equal distances from the plane of symmetry at right angles to the shaft. In each of these blowers, the impeller 21 keyed on the engine shaft, and consequently rotating in the same direction and at the same speed as this latter, gears with the impeller 23 keyed on the auxiliary shaft 24 which is parallel to the engine shaft, carried in the same vertical plane and integral with the fixed parts of the frame. The impeller 23 is put out of balance by means of an aperture suitably calculated. The excentric masses 26 carried on the engine shaft serve as the additional mass $\mu'$ in the preceding theoretical discussion. The impeller with aperture 23 corresponds to the mass $\mu^2$. Moreover the distance $h$ which separates the axis of the impeller from the engine shaft is so chosen that the couple produced by these two sets of masses rotating in opposite directions balances, as has been explained, the couple due to the oscillations of the connecting rods.

The methods of carrying out the invention hereinabove described are only shown by way of example. The general method which has been described allows of balancing the forces and couples of inertia of frequency $n$, the only ones which in practice have an important disturbing effect. In the case where it is desired to balance also forces and couples of a frequency which is a multiple of the fundamental frequency $n$; this can be done similarly by analogous means. For instance in the case of forces X Y, and a couple G of frequency $2n$, it will suffice to arrange two new additional masses, one rotating round the engine shaft and in the same direction at twice the speed of the shaft, the other rotating at the same speed as the shaft but in the opposite direction around an auxiliary shaft parallel therto, and located at a fixed distance therefrom; this result can be obtained by means of suitably arranged gearing.

What I claim is:—

1. In combination with the cylinders and pistons of a two cycle engine, a crank shaft, separate piston rods between the shaft and the separate pistons, and means for delivering air under pressure to the engine and for balancing the engine, comprising a blower, consisting of a casing located on the frame of the engine and communicating with a cylinder of the engine, a balanced impeller mounted on said crank shaft, and located in said casing, an unbalanced impeller located within said casing and cooperating with the balanced impeller, a shaft on which the unbalanced impeller is mounted, located eccentrically of said crank shaft and spaced a predetermined distance therefrom and means for driving said last mentioned shaft at the same speed as said crank shaft.

2. In combination with the cylinders and pistons of a two cycle engine, a crank shaft, separate piston rods between said shaft and the separate pistons, blowers for delivering air to at least one cylinder of the engine, each comprising a casing and two co-operating impellers, some of said impellers being located coaxially of said crank shaft, and some being unbalanced and located eccentrically thereof and means for driving each unbalanced impeller at the same speed as a co-operating balanced impeller.

3. In combination with the cylinders and pistons of a two cycle engine, a crank shaft, separate piston rods between said shaft and the separate pistons, a plurality of blowers for delivering air under pressure to at least one of said engine cylinders, each comprising a casing, two eccentrically arranged impellers one of which is unbalanced located in each casing and means for driving said impellers whereby unbalanced forces occasioned by their rotation counteract unbalanced forces of the engine.

In testimony whereof I have signed this specification.

CHARLES LÉONARD ARMAND MAURICE LEBLANC.